United States Patent
Yiu et al.

(10) Patent No.: US 9,326,152 B1
(45) Date of Patent: Apr. 26, 2016

(54) DYNAMIC SCHEDULING OF NON-INTERFERING CLUSTERS IN A DISTRIBUTED DIVERSITY COMMUNICATIONS SYSTEM

(71) Applicant: Alcatel-Lucent USA Inc., Murray Hill, NJ (US)

(72) Inventors: Simon Yiu, Jersey City, NJ (US); Doru Calin, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/532,079

(22) Filed: Nov. 4, 2014

(51) Int. Cl.
| | |
|---|---|
| H04W 40/00 | (2009.01) |
| H04W 16/10 | (2009.01) |
| H04W 16/32 | (2009.01) |
| H04L 5/00 | (2006.01) |
| H04W 72/04 | (2009.01) |
| H04W 84/04 | (2009.01) |

(52) U.S. Cl.
CPC ............. *H04W 16/10* (2013.01); *H04L 5/0035* (2013.01); *H04W 16/32* (2013.01); *H04W 72/0453* (2013.01); *H04W 84/042* (2013.01)

(58) Field of Classification Search
CPC ... H04W 16/10; H04W 5/0035; H04W 16/32; H04W 72/0453; H04W 84/042
USPC .......... 455/447; 370/329, 330, 280, 278, 338, 370/431
See application file for complete search history.

(56) References Cited

U.S. PATENT DOCUMENTS

| | | | |
|---|---|---|---|
| 9,130,607 B2 * | 9/2015 | Giese | H04B 7/024 |
| 2013/0242812 A1 * | 9/2013 | Khoryaev | H04W 52/0235 370/278 |
| 2013/0303167 A1 * | 11/2013 | Zhu | H04W 76/048 455/436 |

* cited by examiner

*Primary Examiner* — Dhaval Patel
(74) *Attorney, Agent, or Firm* — Mendelsohn Dunleavy, P.C.; Steve Mendelsohn

(57) ABSTRACT

In certain embodiments, a cellular wireless communications network has clusters, each cluster having a plurality of cells and a cluster-level controller that dynamically divides the cluster into non-interfering sub-clusters for each resource allocation unit (e.g., physical resource block). Each sub-cluster has one or more cells that transmit to a single user in the cluster for the resource allocation unit, and at least one sub-cluster has at least two cells that transmit to a single user for the resource allocation unit using a distributed diversity mode of communication in which the at least two cells transmit the same data to the single user. The controller divides the cluster into sub-clusters based on determinations of whether users in the cluster are susceptible to interference from non-serving cells in the cluster. By assigning potentially interfering, non-serving cells to the sub-cluster for a user, those non-serving cells are eliminated as sources of interference.

27 Claims, 3 Drawing Sheets

100

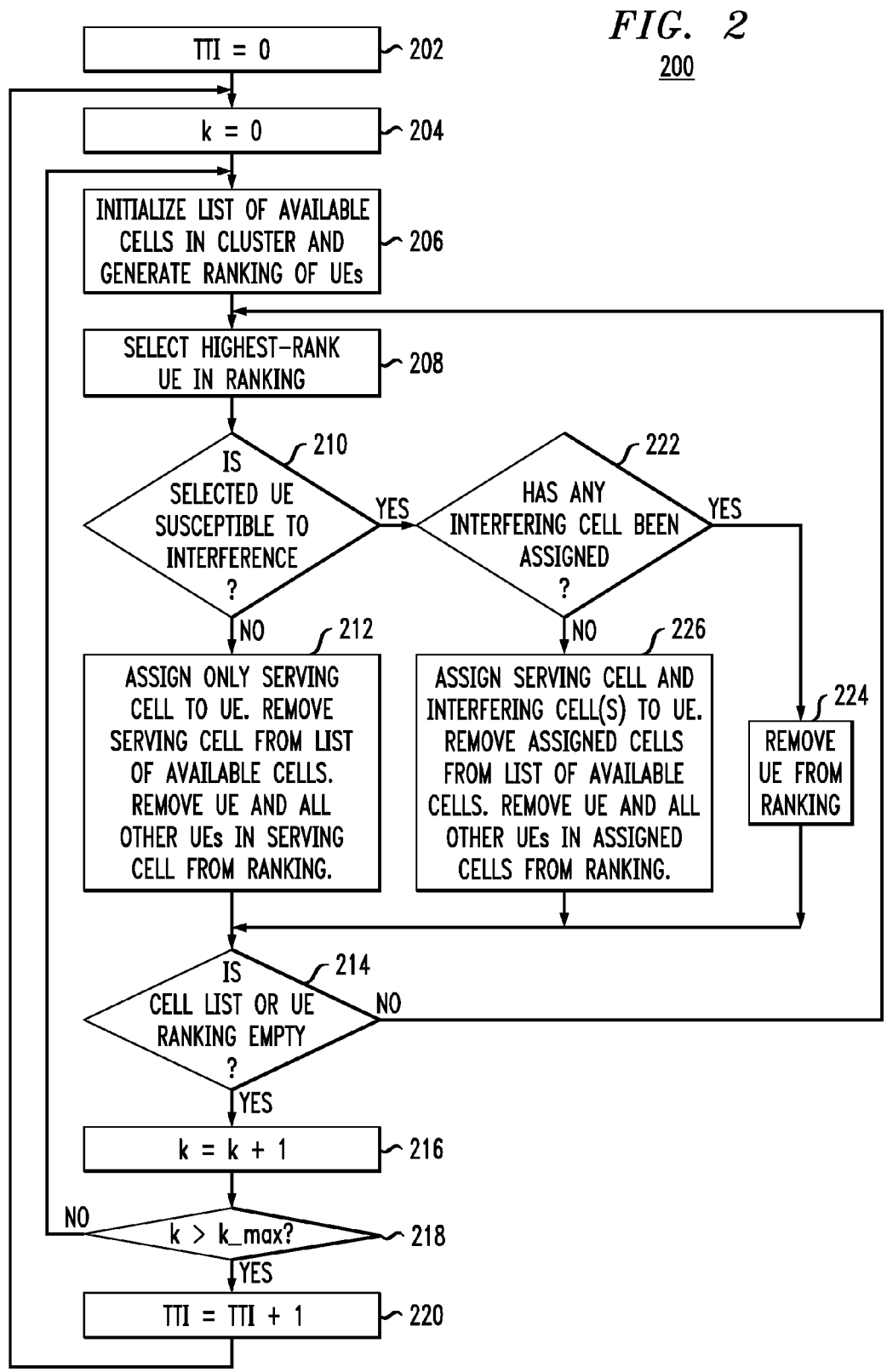

FIG. 3

TABLE I

| ROW | PRB | AVAILABLE CELLS | UE RANKING | SITUATION | CELL 1 | CELL 2 | CELL 3 | CELL 4 |
|---|---|---|---|---|---|---|---|---|
| 1 | k=0 | 1, 2, 3, 4 | UE3, UE2, UE4, UE5, UE6, UE1 | NO INTERFERENCE | | | | UE3 |
| 2 | k=0 | 1, 2, 3 | UE2, UE4, UE5, UE6, UE1 | INTERFERENCE BETWEEN CELL 1 & CELL 2 | UE2 | UE2 | | |
| 3 | k=0 | 3 | UE4, UE5 | NO INTERFERENCE | | | UE4 | |
| 4 | k=1 | 1, 2, 3, 4 | UE1, UE5, UE2, UE4, UE6, UE3 | NO INTERFERENCE | | UE1 | | |
| 5 | k=1 | 1, 3, 4 | UE5, UE2, UE4, UE6, UE3 | NO INTERFERENCE | | | UE5 | |
| 6 | k=1 | 1, 4 | UE2, UE6, UE3 | NO INTERFERENCE | UE2 | | | |
| 7 | k=1 | 4 | UE3 | NO INTERFERENCE | | | | UE3 |
| 8 | k=2 | 1, 2, 3, 4 | UE2, UE5, UE1, UE3, UE6, UE4 | INTERFERENCE BETWEEN CELL 1 & CELL 3 | UE2 | | UE2 | |
| 9 | k=2 | 2, 4 | UE1, UE3 | INTERFERENCE BETWEEN CELL 2 & CELL 1 | | | | |
| 10 | k=2 | 2, 4 | UE3 | NO INTERFERENCE | | | | UE3 |
| 11 | k=2 | 2 | | NO MORE USERS TO SCHEDULE | | | | |

DYNAMIC SCHEDULING OF NON-INTERFERING CLUSTERS IN A DISTRIBUTED DIVERSITY COMMUNICATIONS SYSTEM

BACKGROUND

1. Field of the Invention

The present invention relates to wireless communications and, more specifically but not exclusively, to cellular communications systems that can operate in a distributed diversity mode in which multiple base stations transmit the same data to a single user.

2. Description of the Related Art

This section introduces aspects that may help facilitate a better understanding of the invention. Accordingly, the statements of this section are to be read in this light and are not to be understood as admissions about what is prior art or what is not prior art.

In order to realize the enormous data capacity demand of smart mobile devices and meet user quality-of-service requirements, cellular communications systems having low-power, low-cost, small cells have been widely considered as one of the most-promising solutions. However, there are three major limitations: 1) when additional small cells are added to the system to improve capacity, the cell-edge users (i.e., users located at or near the edge of one cell that is adjacent to another cell) can experience a lot of strong interference levels degrading the throughput performance and actual user experience; 2) each cell is costly to build and operate; and 3) the traffic at each cell fluctuates over time such that the cell may have to be designed to handle the maximum traffic expected, causing a waste of processing resources at off-peak times.

Traditionally, small-cell architectures are proposed to solve the capacity problem. As the density of a small-cell network increases, the interference increases. Traditionally, interference mitigation is achieved by the following techniques:

a) Power control: reduce power to meet desirable SINR (signal-to-interference-noise ratio) target;

b) Marco diversity: cell-edge user communicates with two or more base stations (BSs) simultaneously using a distributed diversity mode in which multiple base stations transmit the same data to a single user; and c) Fractional frequency reuse: segmenting the spectrum into several frequency bands and enabling allocation of different frequency bands to different users.

Without losing any generality, the Long Term Evolution (LTE) communications standard is taken as a reference technology for this disclosure. Those skilled in the art will understand that the disclosure can also be applied in the context of other suitable communications standards.

In LTE-A, coordinated multipoint (CoMP) transmission and reception techniques are considered as promising candidates for efficient interference management to improve cell-edge users' performance. There are different CoMP schemes with different levels of Channel State Information (CSI) sharing and estimation requirements.

In coherent joint transmission, at least two BSs perform joint Multiple-Input Multiple-Output (MIMO) transmission to multiple user equipments (UEs, also referred to herein simply as users) located in different cells. (The terms "cell" and "base station" or BS are used interchangeably in this disclosure.) Although this type of transmission scheme achieves good performance, it has a high backhaul requirement because CSI exchange is required between BSs. This is especially true for frequency-selective channels, where the channel has to be estimated and exchanged for each orthogonal frequency-division multiplexing (OFDM) sub-carrier.

In a non-coherent joint transmission (JT) scheme, a precoder is calculated from each base station independently, based on the local CSI information between the BS and the UE. CSI exchanges among base stations is not required for this type of transmission scheme; however, the performance is typically not as good as the one offered by the coherent joint transmission scheme. It should be noted that, even though CSI exchange is not required between BSs, each BS still has to estimate the channel to the cell-edge user independently.

The aforementioned CoMP schemes use multiple BSs to either beamform the source signal or transmit the source signal using spatial multiplexing. In Marco Diversity (also referred to herein as distributed diversity), multiple BSs transmit the same data to the cell-edge user. No CSI exchange between BSs is required. Due to the different geographical locations of the BSs, received signals at any UE location are most of the time not synchronized. However, as long as the cyclic prefix (CP) is longer than the maximum delay spread from the BSs, the channel at each frequency tone/sub-carrier can still be considered as flat. Essentially, by transmitting the same data from multiple BSs and the fact that the data arrives at different time instances, the resulting channel is effectively turned into a more-frequency-selective channel with a longer delay spread. The increased frequency-selectivity of the channel can be exploited with a forward error-correcting channel code that encodes across several frequency blocks, e.g., LTE Physical Resource Blocks (PRBs).

A key feature of LTE is the possibility to exploit the OFDM radio interface to transmit multicast or broadcast data as multi-cell transmission over a synchronized single-frequency network known as a multicast-broadcast, single-frequency network (MBSFN). In MBSFN, multimedia broadcast/multicast service (MBMS) data is transmitted from multiple time-synchronized cells simultaneously. A UE will receive multiple versions of the signal with different delays. There will be no Inter-Symbol Interference (ISI) if the cyclic prefix is longer than the maximum delay spread of the equivalent channel. It should be noted that MBSFN is a broadcast/multicast feature, where multiple BSs transmit the same information to multiple UEs. Therefore, it is not suitable for unicast transmission, where BSs need to support independent communications with multiple UEs simultaneously.

The above solutions are not sufficient because the cost of increasing the density of small-cell architectures is high. It is also inefficient because traffic is likely bursty in time, resulting in processing resources being wasted when traffic is light.

SUMMARY

In one embodiment, the present invention is a cellular wireless communications network comprising one or more clusters, each cluster comprising a plurality of cells and a cluster-level controller that dynamically divides the cluster into a set of non-interfering sub-clusters for a resource allocation unit. Each sub-cluster comprises one or more cells that transmit to a single user in the cluster for the resource allocation unit, and at least one sub-cluster comprises at least two cells that transmit to a corresponding single user in the cluster for the resource allocation unit.

BRIEF DESCRIPTION OF THE DRAWINGS

Other embodiments of the invention will become more fully apparent from the following detailed description, the appended claims, and the accompanying drawings in which like reference numerals identify similar or identical elements.

FIG. 2 is a flow diagram of a scheduling procedure implemented by Master Cell 2 of FIG. 1 to schedule transmissions in the cluster of FIG. 1; and FIG. 3 is Table I, which tabulates exemplary scheduling results for the first three PRBs of an exemplary time instance TTI for the cluster of FIG. 1 using the scheduling procedure of FIG. 2.

DETAILED DESCRIPTION

Figure 1:
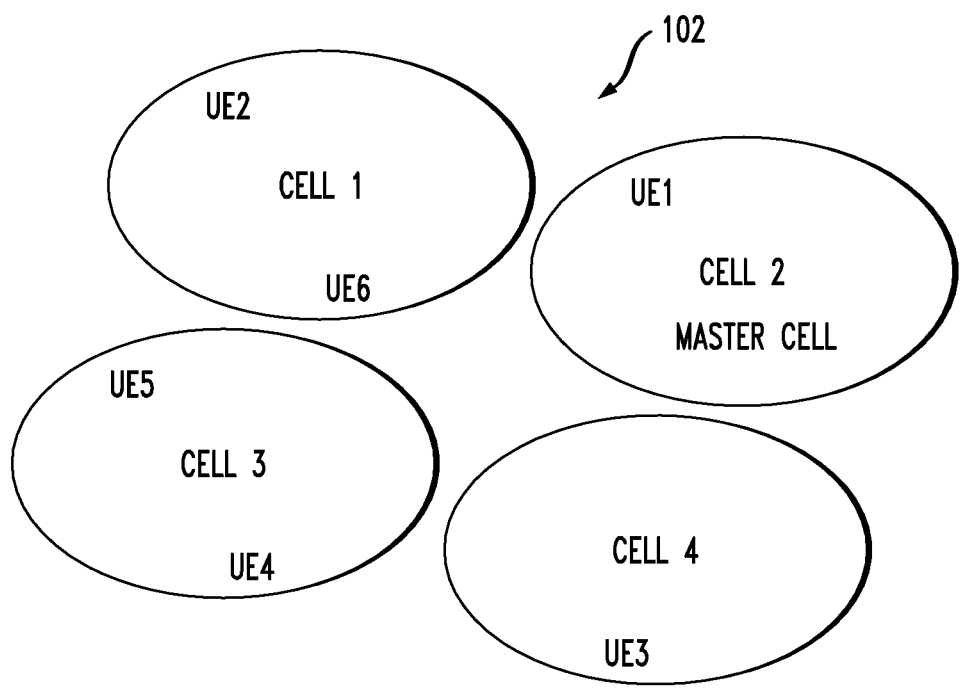
FIG. 1 represents a portion of an exemplary wireless communications network of the disclosure.

FIG. 1 represents a portion of an exemplary wireless communications network 100 comprising four cells labeled Cell 1 through Cell 4 that form a single cluster 102 of cells in network 100. Although not shown in FIG. 1, network 100 may have additional cells that are part of one or more other clusters. In theory, a cluster may have any number of cells. As indicated in FIG. 1, Cell 2 is the master cell for cluster 102 responsible for scheduling downlink transmissions from all of the cells in that cluster to the various users currently located within the cluster. In other implementations, cells other than Cell 2 can be the master cell. As described further below, in other embodiments, some clusters might not have a master cell.

As shown in FIG. 1, six users labeled UE1 through UE6 are currently connected to the cells of cluster 102, where:
Cell 1 is the serving cell for users UE2 and UE6;
Cell 2 is the serving cell for user UE1;
Cell 3 is the serving cell for users UE4 and UE5; and
Cell 4 is the serving cell for user UE3.

The serving cell for a user is assumed to be the cell whose downlink signal has the highest Reference Signal Received Power (RSRP) level (i.e., signal strength) at the user. A user is said to be connected to its serving cell. A user can be connected to only one serving cell at a time.

In one possible implementation, network 100 conforms to an LTE wireless communications standard. Those skilled in the art will understand that the technology described in this disclosure can be implemented in the context of other suitable networks conforming to other suitable communications standards, such as (without limitation) the WiMAX (Worldwide Interoperability for Microwave Access) standard. More particularly, the cells in network 100 transmit downlink signals using orthogonal frequency-division multiplexing (OFDM) modulation techniques. Here, too, those skilled in the art will understand that the technology described in this disclosure can be implemented in the context of other suitable networks that use other suitable modulation techniques, such as (without limitation) Universal Filtered Multi-Carrier (UFMC) or Filter Bank MultiCarrier (FBMC).

The term "resource allocation unit" corresponds to at least one time symbol and at least one frequency subcarrier. In practical implementations, the resource allocation unit often refers to either the smallest unit of transmission (an atomic unit of resource allocation) that is scheduled in network 100 or to a block containing several such smallest units of transmission (or sub-bands). In either case, the resource allocation unit typically corresponds to a single time/frequency instance, and it may vary in size across different instances of resource allocation to users. When network 100 conforms to the LTE standard, resource allocation units are referred to as "physical resource blocks" or PRBs. For OFDM-based communications, one PRB may correspond, in time, to a single OFDM symbol and, in frequency, to a subset (e.g., 12) of the frequencies within an OFDM symbol. For a given PRB, each cell may transmit to at most one user with traditional single-stream techniques. However, one should note that, in the case of multi-user Multiple Input Multiple Output (MIMO) transmissions, multiple users can be multiplexed spatially over the same PRB. For simplicity, the following discussion appears in the context of LTE PRBs and assumes single-stream transmission techniques. Those skilled in the art will understand how to apply those specific teachings to networks that schedule generic resource allocation units.

For a given PRB, a user might or might not be susceptible to interference from one or more non-serving cells. For example, in FIG. 1, user UE2 may be located close enough to the center of its serving Cell 1 such that the PRB signal received from Cell 1 will be sufficiently stronger than the corresponding PRB signals received from the other cells in cluster 102 such that user UE2 will be able to successfully recover the data transmitted to it from Cell 1 even if the other cells in cluster 102 transmit corresponding PRB signals (having different data) to other users in cluster 102. On the other hand, user UE5, for example, may be located close enough to the edge of Cell 3 such that the corresponding PRB signals received from one or more of the other cells in cluster 102 could interfere with the PRB signal received from Cell 3, where such interference could inhibit the ability of user UE5 to accurately decode the data transmitted to it from Cell 3. Note that a user does not necessarily have to be located near the edge of its serving cell to be susceptible to interference from one or more other cells. Similarly, a user that is located near the edge of its serving cell might not be susceptible to interference from one or more other cells.

In order to avoid such interference, network 100 employs a distributed diversity mode of communication in which two or more different cells transmit the same data to a single user in the same PRB. In certain possible implementations, network 100 uses traditional space-time block codes (STBCs) or space-frequency block codes (SFBCs) to achieve distributed diversity, where each of the two or more different cells is assigned a different subset of the columns in the STBC/SFBC code matrix. As long as the cyclic prefix is longer than the delay spread from the different cells, the user should be able to successfully process the received PRB signal.

To schedule a PRB transmission in cluster 102 of FIG. 1, Master Cell 2 generates a ranking of the users in cluster 102 for the current PRB and attempts to assign the PRB sequentially to individual users in order of descending rank. If a selected user is not susceptible to interference from any other (i.e., non-serving) cell in cluster 102, then the users serving cell will be assigned to be the only cell in cluster 102 to transmit to that user for the current PRB. On the other hand, if the selected user is susceptible to interference from one or more non-serving cells in cluster 102, then the user's serving cell and one or more of the potentially interfering, non-serving cells are jointly assigned to transmit to that user for the current PRB using the distributed diversity mode of communication.

This assignment of different groups of one or more cells to different users for a PRB is referred to herein as dynamically dividing the cluster into one or more sub-clusters, where each sub-cluster has one or more cells, and each sub-cluster transmits to a single user for the PRB. For a given PRB, each cell in the cluster can be part of at most one sub-cluster.

The LTE standard, like other modern broadband wireless standards, such as High Speed Packet Downlink/Uplink Access and WiMAX, provides the basic structure to allow the definition of proprietary and differentiating algorithms as related to ranking and scheduling users by their respective serving cells. In certain embodiments of the present disclosure, Master Cell 2 implements a suitable algorithm to generate independently a ranking of all of the users in cluster 102 for each different PRB.

In certain embodiments, Master Cell 2 determines whether a user is susceptible to interference from a non-serving cell in cluster 102 by comparing the Reference Signal Received Power (RSRP) level measured by the user for the reference signal received at the user from its serving cell to the RSRP level measured by the user for the reference signal received at the user from that non-serving cell. If the magnitude of the difference between those two measured RSRP levels is less than a specified threshold level, then the user is determined to be susceptible to interference from that non-serving cell.

Comparing magnitudes of RSRP differences to a specified threshold level is just one possible way of determining interference. Another way could be to compare RSRP ratios to specified threshold levels. Other ways could involve metrics other than RSRP levels, such as signal to interference plus noise ratio (SINR).

As described previously, Master Cell 2 divides cluster 102 into sub-clusters based on whether or not there are any potentially interfering, non-serving cells. (If a selected user has no potentially interfering, non-serving cells, then the sub-cluster for that user will contain only the serving cell.) In some embodiments, sub-cluster size is limited to a specified maximum number N of cells. In those embodiments, when a selected user has N or more potentially interfering, non-serving cells, Master Cell 2 will include the (N−1) potentially interfering, non-serving cells having the greatest RSRP levels in the sub-cluster for that user along with the users serving cell. In embodiments in which sub-cluster size is not limited (other than by the total number of cells in cluster 102), Master Cell 2 will include all potentially interfering, non-serving cells in the sub-cluster along with the users serving cell.

Note that, in embodiments that limit sub-cluster size, the determination of which cells are potentially interfering cells may be different from the determination of which of those potentially interfering cells are to be included in the sub-cluster. Note further that, when the number of potentially interfering cells is less than the specified maximum sub-cluster size, all of the potentially interfering cells will be included in the sub-cluster.

As described previously, if the magnitude of the difference between the highest RSRP and second-highest RSRP levels is greater than the specified threshold, then the user is determined to be not susceptible to interference, and Master Cell 2 assigns only the serving cell to that user. In that case, the sub-cluster assigned to that user has only one cell (i.e., its serving cell).

FIG. 2 is a flow diagram of a scheduling procedure 200 implemented by Master Cell 2 to schedule transmissions in cluster 102 of FIG. 1. In particular, Master Cell 2 schedules transmissions in cluster 102 for a sequence of time instances TTI starting with an initial time instance TTI=0. Furthermore, for each time instance TTI, scheduling procedure 200 schedules a sequence of frequency instances k starting with an initial frequency instance k=0, such that each PRB in scheduling procedure 200 corresponds to a particular frequency instance k of a particular time instance TTI.

In some implementations of scheduling procedure 200 and cluster 102, each time instance TTI corresponds to a different OFDM symbol, and each frequency instance k corresponds to a different subset of OFDM frequency tones (or sub-carriers). For example, in an implementation in which each OFDM symbol has 600 different OFDM frequency tones, and each frequency instance k corresponds to a different subset of 12 OFDM tones, there will be a total of 50 different k values per TTI value. In this case, each PRB corresponds to a particular time/frequency instance TTI/k having a particular subset of 12 OFDM tones for a particular OFDM symbol.

For each PRB, scheduling procedure 200 divides cluster 102 into one or more sub-clusters of cells, where each sub-cluster has one or more cells that transmit the same data to a single user in cluster 102. As described previously, if the sub-cluster has two or more cells, then those two or more cells employ the distributed diversity mode of communication to transmit that same data to that single user. As described further below, depending on the situation, for a given PRB, one or more cells in cluster 102 might not transmit any data, and one or more users in cluster 102 might not receive any data.

As shown in FIG. 2, scheduling procedure 200 begins with Master Cell 2 (i) selecting the first time instance TTI=0 at step 202 and (ii) selecting the first frequency instance k=0 of the selected time instance TTI at step 204. Processing then continues to step 206, where Master Cell 2 (i) initializes a list of available cells in cluster 102 to contain all four Cells 1-4 and (ii) generates a ranking of all six users UE1-UE6 for the selected PRB k, using an appropriate ranking algorithm.

In step 208, Master Cell 2 selects the highest-rank user in the ranking for scheduling. In step 210, Master Cell 2 determines whether the selected user is susceptible to interference from any of the non-serving cells in cluster 102 (e.g., by comparing RSRP levels as described previously). If not, then processing continues to step 212, where Master Cell 2 assigns only the serving cell to the sub-cluster for the selected user for the current PRB. In addition, in step 212, Master Cell 2 (i) updates the list of available cells by removing that assigned, serving cell and (ii) updates the ranking of users by removing the selected user as well as any other users connected to the assigned, serving cell (since each cell can transmit to only one user for a given PRB, and scheduling procedure 200 stipulates that serving cells must participate in any transmissions to their connected users).

Processing then continues to step 214, where Master Cell 2 determines whether the updated list of available cells or the updated ranking of users is empty. If either (or both) are empty, then the scheduling of the current PRB is complete, and processing continues to step 216, where Master Cell 2 increments the frequency index k before continuing to step 218. In step 218, Master Cell 2 determines whether the incremented frequency index k has exceeded the specified maximum frequency index value k_max (e.g., 49 in the example provided previously of 600-tone OFDM symbols and 12-tone frequency instances k). If so, then the scheduling of the current time instance TTI (i.e., the current OFDM symbol) is complete, and processing continues to step 220, where the time index TTI is incremented. Processing then returns to step 204, where the scheduling process for the next time instance (i.e., the next OFDM symbol) is begun. Although not explicitly shown in FIG. 2, after scheduling for the current time instance is complete, the transmission processing for the current time instance can be performed by each assigned cell to construct and transmit an OFDM symbol using either a conventional, single-cell mode of communication or the distributed diversity mode of communication for each PRB, whichever was determined by Master Cell 2.

If Master Cell 2 determines, in step 218, that the incremented frequency index k has not exceeded k_max, then scheduling for the current time instance TTI is not complete, and processing continues to step 206 to (i) re-initialize the list of available cells in cluster 102 to include all of Cells 1-4 and (ii) generate the ranking of users in cluster 102 for the newly selected PRB corresponding to the incremented frequency index k.

If Master Cell 2 determines, in step 214, that the updated list of available cells and the updated ranking of users are both not empty, then scheduling of the current PRB is not complete, and processing returns to step 208 to select the highest-rank user in the updated ranking for scheduling.

If Master Cell 2 determines, in step 210, that the selected user is susceptible to interference from one or more non-serving cells in cluster 102, then processing continues to step 222. In certain embodiments, scheduling procedure 200 stipulates that, if a first user is susceptible to interference from any non-serving cell in cluster 102 that is already scheduled to transmit to another user, then no transmissions will be sent to the first user for the current PRB in order to avoid that possibility of interference. To implement that stipulation, in step 222, Master Cell 2 determines whether any of the potentially interfering, non-serving cells in cluster 102 have already been assigned to transmit for the current PRB. If so, then processing continues to step 224, where Master Cell 2 updates the ranking by removing the selected user (without assigning any cells to transmit to that user) before processing continues to step 214 to determine if scheduling for the current PRB is complete.

If Master Cell 2 determines, in step 222, that none of the potentially interfering, non-serving cells identified in step 210 has already been assigned for the current PRB, then processing continues to step 226. In certain embodiments, scheduling procedure 200 stipulates that the serving cell and all potentially interfering, non-serving cells should be grouped together in a sub-cluster that will employ the distributed diversity mode of communication to transmit the same data to a selected user for the current PRB. Note that, as described previously, in other embodiments, sub-cluster size may be limited to N cells (i.e., the serving cell and the (N–1) potentially interfering, non-serving cells having the greatest RSRP levels), where N is some specified integer greater than one.

To implement that stipulation, in step 226, Master Cell 2 groups the serving cell and one or more potentially interfering, non-serving cells in cluster 102 into a sub-cluster that is assigned to transmit the same data to the user using the distributed diversity mode of communication for the current PRB. In addition, Master Cell 2 (i) updates the list of available cells by removing all of those assigned, sub-cluster cells and (ii) updates the ranking of users by removing the selected user as well as any other users connected to any of the assigned, sub-cluster cells. Processing then continues to step 214 to determine if scheduling for the current PRB is complete.

FIG. 3 is Table I, which tabulates exemplary scheduling results for the first three PRBs (i.e., k=0, 1, 2) of an exemplary time instance TTI for cluster 102 of FIG. 1 using scheduling procedure 200 of FIG. 2.

As tabulated in Row 1 of Table I, in step 206, Master Cell 2 (i) initializes the list of available cells in cluster 102 to include all four Cells 1-4 and (ii) generates an exemplary sequential ranking for the users UE1-UE6 in cluster 102 for PRB k=0 to be (UE3, UE2, UE4, UE5, UE6, UE1), where user UE3 is the highest-rank user, and user UE1 is the lowest-rank user. In step 208, Master Cell 2 selects the highest-rank user UE3 in the ranking, where Cell 4 is the serving cell for user UE3, and, in step 210, Master Cell 2 determines that user UE3 is not susceptible to interference from any non-serving cells. As such, as indicated in Row 1, in step 212, Master Cell 2 assigns only serving Cell 4 to user UE3. In addition, as indicated in Row 2, Master Cell 2 (i) updates the list of available cells by removing assigned Cell 4 and (ii) updates the ranking of users by removing user UE3, which is the only user connected to assigned Cell 4. In step 214, Master Cell 2 determines that the updated list of available cells and the updated ranking of users are both not empty, and processing returns to step 208.

As tabulated in Row 2, in step 208, Master Cell 2 selects the highest-rank user UE2 in the updated ranking, where Cell 1 is the serving cell for user UE2. In step 210, Master Cell 2 determines that user UE2 is susceptible to interference from non-serving Cell 2. In step 222, Master Cell 2 determines that potentially interfering Cell 2 has not yet been assigned for the current PRB k=0 (i.e., Cell 2 is still in the list of available cells). As such, in step 226, Master Cell 2 groups serving Cell 1 and potentially interfering, non-serving Cell 2 in a sub-cluster that is assigned to transmit to user UE2 using the distributed diversity mode of communication for the current PRB k=0. In addition, as indicated in Row 3, Master Cell 2 (i) updates the list of available cells by removing both assigned Cells 1 and 2 and (ii) updates the ranking of users by removing user UE2 and also users UE6 and UE1, each of which is connected to either assigned Cell 1 or assigned Cell 2. In step 214, Master Cell 2 determines that the updated list of available cells and the updated ranking of users are both not empty, and processing again returns to step 208.

As tabulated in Row 3, in step 208, Master Cell 2 selects the highest-rank user UE4 in the updated ranking, where Cell 3 is the serving cell for user UE4. In step 210, Master Cell 2 determines that user UE4 is not susceptible to interference from any non-serving cells. As such, as indicated in Row 3, in step 212, Master Cell 2 assigns only serving Cell 3 to user UE4. In addition, Master Cell 2 (i) updates the list of available cells by removing assigned Cell 3 and (ii) updates the ranking of users by removing user UE4 and also user UE5, which is also connected to assigned Cell 3.

At this point, in step 214, Master Cell 2 determines that the updated list of available cells and the updated ranking of users are both empty, and processing proceeds to step 216, where Master Cell 2 increments the PRB index k to have a value of 1, which is less than k_max (e.g., 49), such that processing continues to step 206 for the next PRB. Note that, in step 214, it is sufficient for either the updated list of available cells or the updated ranking of users to be empty for processing to proceed to step 216.

As tabulated in Row 4, in step 206, Master Cell 2 (i) re-initializes the list of available cells in cluster 102 to include all four Cells 1-4 and (ii) generates an exemplary ranking for the users UE1-UE6 in cluster 102 for PRB k=1 to be (UE1, UE5, UE2, UE4, UE6, UE3). In step 208, Master Cell 2 selects the highest-rank user UE1 in the ranking, where Cell 2 is the serving cell for user UE1, and, in step 210, Master Cell 2 determines that user UE1 is not susceptible to interference from any non-serving cells. As such, as indicated in Row 4, in step 212, Master Cell 2 assigns only serving Cell 2 to user UE1. In addition, as indicated in Row 5, Master Cell 2 (i) updates the list of available cells by removing assigned Cell 2 and (ii) updates the ranking of users by removing user UE1, which is the only user connected to assigned Cell 2. In step 214, Master Cell 2 determines that the updated list of available cells and the updated ranking of users are both not empty, and processing returns to step 208.

As tabulated in Row 5, processing then returns to step 208, where Master Cell 2 selects the highest-rank user UE5 in the updated ranking, where Cell 3 is the serving cell for user UE5.

In step 210, Master Cell 2 determines that user UE5 is not susceptible to interference from any non-serving cells. As such, as indicated in Row 5, in step 212, Master Cell 2 assigns only serving Cell 3 to user UE5. In addition, as indicated in Row 6, Master Cell 2 (i) updates the list of available cells by removing assigned Cell 3 and (ii) updates the ranking of users by removing user UE5 and also user UE4, which is also connected to assigned Cell 3. In step 214, Master Cell 2 determines that the updated list of available cells and the updated ranking of users are both not empty, and processing again returns to step 208.

As tabulated in Row 6, processing again returns to step 208, where Master Cell 2 selects the highest-rank user UE2 in the updated ranking, where Cell 1 is the serving cell for user UE2. In step 210, Master Cell 2 determines that user UE2 is not susceptible to interference from any non-serving cells. As such, as indicated in Row 6, in step 212, Master Cell 2 assigns only serving Cell 1 to user UE2. In addition, as indicated in Row 7, Master Cell 2 (i) updates the list of available cells by removing assigned Cell 1 and (ii) updates the ranking of users by removing user UE2 and also user UE6, which is also connected to assigned Cell 1. In step 214, Master Cell 2 determines that the updated list of available cells and the updated ranking of users are both not empty, and processing again returns to step 208.

As tabulated in Row 7, processing again returns to step 208, where Master Cell 2 selects the highest-rank user UE3 in the updated ranking, where Cell 4 is the serving cell for user UE3. In step 210, Master Cell 2 determines that user UE3 is not susceptible to interference from any non-serving cells. As such, as indicated in Row 7, in step 212, Master Cell 2 assigns only serving Cell 4 to user UE3. In addition, Master Cell 2 (i) updates the list of available cells by removing assigned Cell 4 and (ii) updates the ranking of users by removing user UE3, which is the only user connected to assigned Cell 4.

At this point, at step 214, Master Cell 2 determines that the list of available cells and the ranking of users are both empty, and processing proceeds to step 216, where Master Cell 2 increments the PRB index k to have a value of 2, which is still less than k_max, such that processing continues to step 206 for the next PRB.

As tabulated in Row 8, in step 206, Master Cell 2 (i) re-initializes the list of available cells in cluster 102 to include all four Cells 1-4 and (ii) generates an exemplary ranking for the users UE1-UE6 in cluster 102 for PRB k=2 to be (UE2, UE5, UE1, UE3, UE6, UE4). In step 208, Master Cell 2 selects the highest-rank user UE2 in the ranking, where Cell 1 is the serving cell for user UE2, and, in step 210, Master Cell 2 determines that user UE2 is susceptible to interference from non-serving Cell 3. In step 222, Master Cell 2 determines that potentially interfering Cell 3 has not yet been assigned for the currently selected PRB (i.e., Cell 3 is still in the list of available cells). As such, in step 226, Master Cell 2 groups serving Cell 1 and potentially interfering, non-serving Cell 3 in a sub-cluster that is assigned to transmit to user UE2 using the distributed diversity mode of communication. In addition, as indicated in Row 9, Master Cell 2 (i) updates the list of available cells by removing both assigned Cells 1 and 3 and (ii) updates the ranking of users by removing user UE2 and also users UE4, UE5, and UE6, each of which is connected to either assigned Cell 1 or assigned Cell 3. In step 214, Master Cell 2 determines that the updated list of available cells and the updated ranking of users are both not empty, and processing returns to step 208.

As tabulated in Row 9, in step 208, Master Cell 2 selects the highest-rank user UE1 in the updated ranking, where Cell 2 is the serving cell for user UE1, and, in step 210, Master Cell 2 determines that user UE1 is susceptible to interference from non-serving Cell 1. In step 222, Master Cell 2 determines that potentially interfering Cell 1 has already been assigned for the currently selected PRB (i.e., Cell 1 is no longer in the list of available cells). As such, as indicated in Rows 9 and 10, in step 224, Master Cell 2 removes user UE1 from the ranking without assigning any cells to transmit to user UE1 for the current PRB, and processing returns to step 208.

As tabulated in Row 10, in step 208, Master Cell 2 selects the highest-rank user UE3 in the updated ranking, where Cell 4 is the serving cell for user UE3. In step 210, Master Cell 2 determines that user UE3 is not susceptible to interference from any non-serving cells. As such, as indicated in Row 10, in step 212, Master Cell 2 assigns only serving Cell 4 to user UE3. In addition, Master Cell 2 (i) updates the list of available cells by removing assigned Cell 4 and (ii) updates the ranking of users by removing user UE3, which is the only user connected to assigned Cell 4.

As tabulated in Row 11, at this point, in step 214, Master Cell 2 determines that the list of available cells is not empty (i.e., Cell 2 is still on the list), but that the updated ranking of users is empty, so processing proceeds to step 216, where Master Cell 2 increments the PRB index k to have a value of 3, which is less than k_max, such that processing continues to step 206 for the next PRB k=3, which is not tabulated in FIG. 3. Note that, for PRB k=2, Cell 2 is not assigned to transmit to any user.

At the end of scheduling for each PRB, cluster 102 will be divided into one or more non-interfering sub-clusters, where each different sub-cluster comprises a different set of one or more cells transmitting the same set of data to a single, different user.

Without limitation, LTE has been used as a reference to describe the ideas of this disclosure. In general, the ideas can be applied to any appropriate sensor network, where sensors employ a version of the proposed scheme to forward information to a fusion center.

As described above, in certain embodiments, the cells of a cellular communications network are divided into one or more static clusters, each cluster having a plurality of adjacent cells and a centralized unit (e.g., either located in a master cell or in the cloud) that dynamically groups potentially interfering cells into sub-clusters and schedules transmissions for all cells in the cluster. The cells in a sub-cluster resemble a virtual antenna array and transmit the source signals using traditional space-time block codes (STBCs) or space-frequency block codes (SFBCs) to achieve diversity gain. In certain embodiments, the sub-cluster-based STBC/SFBC processing is applicable only to users satisfying a pre-defined interference criterion. The benefit of STBC and SFBC codes is that CSI is not required at the transmitter, and no CSI exchange is required between cells, only CSI exchange from the cells to the centralized unit. Also, the user receiver structure does not need to be changed since a conventional diversity receiver can be used.

In a typical implementation, a cluster contains cells that interfere with each other. This means that the cells will typically be geographically close to each other. This also has the implication that the requirement of having a backhaul interconnecting the cells in the cluster can be more easily satisfied. It is assumed that each user is connected to one cluster only, and a user is said to be connected to a cluster if its serving cell belongs to the cluster. Furthermore, it is assumed that each cell belongs to one and only one cluster and, for a given time/frequency instance, each cell belongs to one and only one sub-cluster in that one cluster.

A centralized unit is responsible for coordinating the scheduling and modulation and coding scheme selection of all cells in the cluster. This centralized unit can be located in one of the cells in the cluster, in which case, the cell is essentially a traditional BS in the radio access network (RAN) where the baseband unit (BBU) and the remote radio heads (RRHs) are collocated. In certain other embodiments, the centralized unit is located in the cloud, in which case, the cells in the cluster are simply RRHs without a dedicated, local BBU, and a shared BBU is located in the cloud. Note that, depending on the implementation, all or a subset of the layer 1, layer 2, and layer 3 functions are located in the BBU. The RRHs are connected to the BBU via high-bandwidth, low-latency CPRI (Common Public Radio Interface) links. This essentially resembles a cloud-radio access network (C-RAN). The cells listen to and follow the scheduling decisions of the centralized unit. Each sub-cluster T consists of a serving cell and $M\_i-1$ slave cells.

If the centralized unit is located in one of the cells, it can be in any sub-cluster, and either the serving cell or a slave cell can be the centralized unit. However, it should be noted that there is only one centralized unit in a cluster, and it can belong to any sub-cluster. The one or more cells in each sub-cluster have the same data and signaling information available in order to transmit the data with the same Modulation and Coding Scheme (MCS) using the same PRBs over the air interface. Assuming each BS in the sub-cluster 'i' has $N\_T$ transmit antenna ports, the source symbols are encoded in a STBC/SFBC code matrix with dimension $M\_i \times N\_T$. The PRB allocation is communicated to all the cells in the sub-cluster over a fast backhaul X2 link, and each cell in the sub-cluster transmits $N\_T$ columns of the $(M\_i \times N\_T)$-dimensional STBC/SFBC code matrix. In the architecture of a traditional RAN, the RRH, BBU, analog, digital, and power functions are installed in a eNodeB. Usually the eNodeB cabinet is placed in a dedicated equipment room with all necessary site-supporting facilitates like power, backup battery, air conditioning, environment surveillance system, backhaul transmission equipment, etc. The RF signal from the base station RF unit goes through pairs of RF cable to the antennas on the top or base station tower or antenna-mounting points resulting in cable loss. This all-in-one base station architecture is mostly used in macro-cell deployment in 1G and 2G networks, but also in LTE (e.g., all-in-one small cells implementation). The eNodeBs are interconnected with the X2 interface and are connected to the core network via the 51 links/backhaul.

If the centralized unit is located remotely in the C-RAN BBU, the scheduler will not be co-located in any of the cells. In this case, the cells may simply be RRHs. The cells/RRHs in a sub-cluster have the same data and signaling information available in order to transmit the data with the same Modulation and Coding Scheme (MCS) using the same PRB over the air interface. Assuming each BS in the sub-cluster T has $N\_T$ transmit antenna ports, the source symbols are encoded in a STBC/SFBC with dimension $M\_i \times N\_T$. The PRB allocation is communicated from the centralized unit to all cells/RRHs in the sub-cluster over the CPRI link, and each cell/RRH in the sub-cluster transmits $N\_T$ columns of the $(M\_i \times N\_T)$-dimensional STBC/SFBC matrix. The benefit of having the centralized scheduler in the C-RAN BBU is that the cost of deploying an expensive traditional BS can be reduced. Also, processing power can be adjusted accordingly depending on the traffic demand. In the architecture of the C-RAN, the RRH is separated from the BBU. Digital baseband signals are carried over the fiber, usually using CPRI.

The RRH can be installed on the top of towers, close to the antenna. This reduces the cable loss compared to the traditional base station where the RF signal has to travel through a long cable from the base station cabinet to the antenna at the top of tower. The fiber link between RRH and BBU also allows BBUs to be placed in a centralized location which allows much more flexibility in network planning and deployment interference management technologies like CoMP. This allows network processing aggregation, more-efficient sharing of resources, and dynamic allocation of the spectrum.

With the transmission strategy referred to as the distributed diversity mode, interference is avoided, and a diversity order of $M\_i \times N\_T$ can be achieved. In certain embodiments, the MAC scheduler that controls the allocation of PRBs to the UEs is located in the centralized unit. In LTE Release 8, all UEs report CQI/PMI/RI (Channel Quality Indicator/Pre-coding Matrix Indicator/Rank Indicator) information to their respective serving BS. In the case where the centralized unit is co-located with a (master) cell, all serving cells forward their CQI/PMI/RI information over the X2 interface to the master cell where the centralized unit is located. In the case where the centralized unit is located in the C-RAN BBU, the cells forward their CQI/PMI/RI information via the CPRI links to the centralized unit in the cloud. In other words, in either case, one central scheduler per cluster manages all resource allocations of all UEs within the cluster service area.

It should be noted that, in general, signals arriving at a receiver from multiple sources have different propagation delay even though the sources are perfectly synchronized. However, this is generally not a problem for OFDM systems, and ISI (Inter Symbol Interference) can be avoided, as long as the delay spreads are within the CP (Cyclic Prefix). In LTE, the length of a normal CP is ~5 us. For MBSFN, there is an option to use an extended CP which is ~17 us. However, it should be noted that only 6 OFDM symbols are in a slot for the extended CP case as opposed to 7 OFDM symbols for the normal CP case. Therefore, fewer data symbols can be transmitted for scenarios where extended CP is employed. For the proposed distributed diversity mode, the normal CP, or a similarly small CP, is sufficient even though signals are coming from multiple sources. The rationale behind this assertion is that typical applications of this disclosure target small-cell environments, where the cells are geographically closed to each other, resulting in limited delay spread and negligible synchronization issues.

As described previously, the centralized unit controls the PRB allocation of all UEs. Further, an atomic unit of allocation is the minimum amount of resources that can be allocated by schedulers to a UE at a resource grant. Depending on the implementation, the atomic unit can be either the size of a PRB or at least the size of a frequency sub-band. Usually a frequency sub-band contains several PRBs. For clarity, in this disclosure, resource allocation is per PRB, i.e., the PRB is the atomic unit for resource allocation. Nevertheless, the concepts are equally applicable per frequency sub-band, and alternative embodiments of this disclosure are referring to as per-sub-band resource allocation.

As described previously, for each PRB, the scheduler in the centralized unit determines the UE that will be assigned the resource. The scheduler then checks whether the UE is susceptible to interference by checking if any other cell is transmitting sufficiently strong signals to the UE. In certain embodiments, one or more cells that are creating a specified level of interference become slave cells. Note that the specified level of interference can be adjusted to control the size of the sub-cluster, and cells that are creating low to residual interference levels can be left out of the sub-cluster construction. The serving cell and the one or more slave cells will form a sub-cluster and transmit in the distributed diversity mode collaboratively. The PRB allocation is communicated to the serving cell and the slave cell(s) over the X2 or CPRI link depending on where the centralized unit is located. On the other hand, for a UE that is not susceptible to interference from any non-serving cells, the serving cell is the only cell that transmits the source symbols to the UE that is assigned the PRB.

Note that user scheduling is done according to a scheduling mechanism that has some form of scheduling priority, i.e., users are getting temporary access to system resources according to their ranking based on priority level. A Proportional Fair scheduler is a possible scheduler, but the disclosure does not impose any particular scheduler.

After forming the first sub-cluster and assigning the PRB for the first-ranked UE according to the scheduling policy, the scheduler updates the list of cells in the cluster by removing those cells that have their resource assigned previously in the first sub-cluster. This procedure guarantees that cells that create interference to the winning UE will be included in the first sub-cluster. If there are remaining cells in the cluster, i.e., if $N-M\_1>0$, the scheduler should assign the PRB of those remaining cells to the remaining winning users following the scheduling policy (chosen from the list of users connected to the remaining $N-M\_1$ cells) using the same scheduling procedure as mentioned above. However, the previously assigned cells may create interference to the remaining UEs. Therefore, the scheduler should keep track of all the cells with their resource already assigned. When the scheduler picks the winning user from the remaining cells, it checks whether any previously assigned cell creates interference to the winning user. If there is interference from any previously assigned cell, then the UE will not be scheduled, and the scheduler will schedule the next best user.

The procedure is repeated until the resource assignment of all cells in the cluster is finished or until all users have been considered. The benefit of this scheduling procedure is that it is guaranteed that the cells creating interference to each other form a sub-cluster and transmit collaboratively while guaranteeing that the sub-clusters create negligible interference to each other.

By transmitting in the distributed diversity mode, a lower BER can be achieved for a given SNR or alternatively, a lower SNR is required to achieve a certain BER. For example, to achieve a BER of 10e-2, an SNR of 16.5 dB is required for the $1 \times 1$ system, while an SNR of only 11.5 dB is required for a standard $2 \times 1$ Alamouti scheme with diversity order 2 (two antenna ports at each cell site). On the other hand, the same BER can be achieved at only 9.6 dB if $M\_i=2$ cells, each with $N\_T=2$ antennas, transmit in the distributed diversity mode ($4 \times 1$ curve). 3GPP has specified certain PER requirements for different applications.

As mentioned before, the distributed diversity mode is proposed for users where the SNR tends to be relatively low. When two cells transmit collaboratively as opposed to transmitting independently, the interference would be turned into useful signal improving the SNR significantly. Consider a scenario where there are $M\_i=2$ cells in a sub-cluster, each cell with $N\_T=2$ antennas. Traditionally, each cell will transmit using the 2-dimensional STBC independently. The two cells create interference to each other resulting in a very low SINR. On the other hand, using the proposed scheduling algorithm with the two cells transmitting in the distributed diversity mode, in addition to the increased diversity (diversity of 4 as opposed to 2 previously), the SNR will improve significantly because there is no interference.

In a traditional macro-cellular system, an increase in SINR translates into an improvement in the link budget. As a result, a larger inter-site distance is possible, and fewer cells are required to cover a given area. In a small-cell environment, it is desirable to place as many cells as possible within a given area for maximal spectral reuse and to maximize capacity. By using the procedures described in this disclosure, one can increase the density of the cells in a given area (and thus the capacity of a given area) because the SINR is not detrimentally affected by the interference coming from the other cells (those potentially interfering cells will become slaves cell and thus will not contribute to the interference term in the SINR).

As mentioned above, the centralized unit is responsible to perform scheduling for all the UEs in the cluster. Therefore, the serving cells forward their CQI/PMI/RI information of all UEs to the centralized unit either through the X2 interference or the CPRI link. Note that this will incur a significant amount of control signals passing between the centralized unit and all the serving cells. Ideally, this message passing is done on a per PRB and per TTI basis. In a realistic system, in order to reduce the control signal overhead, PRBs are grouped in sub-bands, and CQI/PMI/RI information is reported for those sub-bands every n TTIs, where n is a configurable variable. The size of the sub-bands depends on the frequency selectivity of the channel. For example, sub-band size can be larger for relatively flat channels. The feedback frequency is related to the variable n. For a relatively stationary channel with high coherence time, n can be set to a relatively high value. The idea is that the channel will stay the same for a relatively long period of time. As a result, CQI/PMI/RI reports are not required frequently. The LTE standard defines various sub-band configurations, as a function of total available bandwidth. Usually, in order to maintain a good tradeoff between the frequency selectivity gains per sub-band and the associated overhead related to signaling per sub-band, the minimum size of sub-band increases as the total available bandwidth increases.

It is not necessary for the cells to forward the CQI/PMI/RI information of all UEs to the centralized unit. One way to reduce the overhead is to implement a two-stage ranking/scheduling mechanism. The cell first ranks its UEs according to some criteria and passes the CQI/PMI/RI information of its winner to the centralized unit. The centralized unit will then schedule the UEs from the pool of winners from all the serving cells.

Using exemplary cluster 102 of FIG. 1 and the UE ranking of FIG. 3 for the k=0 PRB, the winner of Cell 1 is UE2, winner of Cell 2 is UE1, winner of Cell 3 is UE4, and finally, the winner of Cell 4 is UE3. Therefore, only the CQI/PMI/RI information of these UEs (UE2, UE1, UE4, and UE3) will be passed to the centralized unit. The centralized unit then performs scheduling on these UEs. For the k=1 PRB, the winner of Cell 1 is UE2, the winner of Cell 2 is UE1, the winner of Cell 3 is UE5, and the winner of Cell 4 is UE 3. Therefore, only the CQI/PMI/RI information of UE2, UE1, UE5, and UE3 will be passed to the centralized unit.

Another way to reduce the control signal overhead is to divide the spectrum into two non-overlapping parts where interference-susceptible UEs are allowed to be scheduled in only one part whereas the other (i.e., non-interference-susceptible) UEs are allowed to be scheduled in only the other part. The centralized unit is responsible in scheduling for the interference-susceptible UEs, and scheduling for the other UEs is still done at the serving cells. In this way, the serving cells need to pass the CQI/PMI/RI information of only the winning, interference-susceptible UEs to the centralized unit.

The serving cells do not need to pass the CQI/PMI/RI information of the other UEs to the centralized unit since scheduling of those UEs is done locally at the serving cells.

The ratio y of resources assigned to interference-susceptible UEs and other UEs can be defined as follows:

$$y = K\_c/K\_n,$$

where K_c is the number of resources (PRBs/sub-bands) reserved for interference-susceptible UEs and K_n is the number of resources (PRBs/sub-bands) reserved for the other UEs.

Assuming a uniform traffic pattern across all UEs in a given cell, the partition of the spectrum may be done according to the following equation:

$$y = K\_c/K\_n = N\_c/N\_n, \text{ where}$$

N_c is the number of interference-susceptible UEs, and N_n is the number of the other UEs. This way, the resource is allocated fairly to both interference-susceptible and the other UEs. Since the UEs distribution is likely different for different cells, the variable y is different for each cell in the cluster. This could potentially create a conflict in the scheduling decision between the centralized unit and the serving cell. Imagine an exemplary system with 10 PRBs and 2 cells. Cell 1 assigns 3 PRBs to the interference-susceptible UEs, and Cell 2 assigns 5 PRBs to the interference-susceptible UEs. Suppose the centralized unit schedules an interference-susceptible UE from Cell 2, such that serving Cell 2 is to transmit collaboratively with slave Cell 1 in the distributed diversity mode. The problem arises when the PRB assigned to this interference-susceptible UE is originally reserved to non-interference-susceptible UEs of Cell 1.

To overcome the aforementioned problem, the cells can still define the variable y locally. However, the variable y chosen by each cell needs to be communicated to the centralized unit, and the centralized unit makes a final decision on what variable y to use and communicates its decision back to all the cells in the cluster. In certain embodiments, the variable y can be set to the smallest y received from all cells.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A cellular wireless communications network comprising one or more clusters, each cluster comprising:
    a plurality of cells; and
    a cluster-level controller that dynamically divides the cluster into a set of non-interfering sub-clusters for a resource allocation unit, wherein:
        each sub-cluster comprises one or more cells that transmit to a single user in the cluster for the resource allocation unit;
        at least one sub-cluster comprises at least two cells that transmit to a corresponding single user in the cluster for the resource allocation unit;
        the controller dynamically divides the cluster into the set of non-interfering sub-clusters based on a cluster-level ranking of users in the cluster;
        each user in the cluster is connected to only one serving cell in the cluster; and
        for a highest-rank user in the ranking, the controller defines a sub-cluster for the highest-rank user, wherein:
            if the controller determines that the highest-rank user has one or more potentially interfering, non-server cells in the cluster, then the controller includes in the sub-cluster for the highest-rank user (i) the one or more potentially interfering, non-serving cells and (ii) the serving cell for the highest-rank user; and
            if the controller determines that the highest-rank user has no potentially interfering, non-server cells in the cluster, then the controller includes in the sub-cluster for the highest-rank user only the serving cell for the highest-rank user.

2. The invention of claim 1, wherein the controller dynamically divides the cluster into the set of non-interfering sub-clusters for the resource allocation unit based on channel conditions in the cluster.

3. The invention of claim 1, where the resource allocation unit corresponds to at least one time symbol and at least one frequency subcarrier.

4. The invention of claim 1, wherein the controller determines that a non-serving cell in the cluster is a potentially interfering, non-serving cell for the highest-rank user when a measured power level at the highest-rank user from the non-serving cell is less than a specified threshold value below a measured power level at the highest-rank user from the serving cell for the highest-rank user.

5. The invention of claim 1, wherein, after defining the sub-cluster for the highest-rank user:
    the controller updates a list of available cells in the cluster by removing the cells in the sub-cluster;
    the controller updates the ranking of users by removing the highest-rank user and any other users connected to any of the cells in the sub-cluster; and
    if both of (i) the updated list of available cells and (ii) the updated ranking of users are not empty, then the controller attempts to schedule transmission to a highest-rank user in the updated ranking.

6. The invention of claim 1, wherein, if the highest-rank user is susceptible to interference from a cell that has already been scheduled for the resource allocation unit, then the highest-rank user is removed from the ranking without scheduling any transmission to the highest-rank user for the resource allocation unit.

7. The invention of claim 1, wherein:
    each cell ranks its own users and determines its cell-level highest-rank user;
    one or more cells identify their cell-level highest-rank users to the controller; and
    the controller generates the cluster-level ranking based on the identified cell-level highest-rank users.

8. The invention of claim 7, wherein:
    each cell determines whether or not its cell-level highest-rank user is susceptible to interference from another cell in the cluster;
    each cell that determines that its cell-level highest-rank user is not susceptible to interference schedules its cell-level highest-rank user for the resource allocation unit; and
    each cell that determines that its cell-level highest-rank user is susceptible to interference identifies its cell-level highest-rank user to the controller for the resource allocation unit.

9. The invention of claim 1, wherein the at least two cells in the at least one sub-cluster transmit to the corresponding single user using (i) a distributed diversity mode of communication in which the at least two cells share a single transmission code or (ii) other coordinated multipoint (COMP) scheme.

10. The invention of claim 9, wherein:
    the shared transmission code is a block code; and
    each cell in the at least one sub-cluster is assigned a different subset of one or more columns of the block code.

11. The invention of claim 1, wherein:
    the controller dynamically divides the cluster into a corresponding set of non-interfering sub-clusters independently for each of multiple, different resource allocation units; and
    the corresponding sets of non-interfering sub-clusters are different for at least two of the resource allocation units.

12. The invention of claim 1, wherein:
    one or more of the cells have a remote radio head (RRH), but no dedicated baseband unit (BBU); and
    the cluster comprises a shared BBU for all of the cells in the cluster, wherein the shared BBU implements the controller.

13. The invention of claim 12, wherein the plurality of cells further comprises a master cell having the shared BBU.

14. The invention of claim 13, wherein:
    none of the cells in the cluster has a BBU; and
    the shared BBU is cloud-implemented.

15. The invention of claim 1, wherein the communications network is an LTE communications network.

16. The invention of claim 1, wherein the network further comprises one or more other clusters, wherein:
    each other cluster has a plurality of other cells; and
    each other cluster comprises an other cluster-level controller that dynamically divides the other cluster into an other set of non-interfering sub-clusters, each sub-cluster comprising one or more other cells that transmit to a single user in the other cluster.

17. A cluster-level controller for the network of claim 1.

18. A cell for the network of claim 1.

19. A cellular wireless communications network comprising one or more clusters, each cluster comprising:
- a plurality of cells; and
- a cluster-level controller that dynamically divides the cluster into a set of non-interfering sub-clusters for a resource allocation unit, wherein:
    - each sub-cluster comprises one or more cells that transmit to a single user in the cluster for the resource allocation unit;
    - at least one sub-cluster comprises at least two cells that transmit to a corresponding single user in the cluster for the resource allocation unit;
    - the controller dynamically divides the cluster into the set of non-interfering sub-clusters based on a cluster-level ranking of users in the cluster;
    - each cell ranks its own users and determines its cell-level highest-rank user;
    - one or more cells identify their cell-level highest-rank users to the controller; and
    - the controller generates the cluster-level ranking based on the identified cell-level highest-rank users.

20. The invention of claim 19, wherein:
- each cell determines whether or not its cell-level highest-rank user is susceptible to interference from another cell in the cluster;
- each cell that determines that its cell-level highest-rank user is not susceptible to interference schedules its cell-level highest-rank user for the resource allocation unit; and
- each cell that determines that its cell-level highest-rank user is susceptible to interference identifies its cell-level highest-rank user to the controller for the resource allocation unit.

21. A cluster-level controller for the network of claim 19.

22. A cell for the network of claim 19.

23. A cellular wireless communications network comprising one or more clusters, each cluster comprising:
- a plurality of cells; and
- a cluster-level controller that dynamically divides the cluster into a set of non-interfering sub-clusters for a resource allocation unit, wherein:
    - each sub-cluster comprises one or more cells that transmit to a single user in the cluster for the resource allocation unit;
    - at least one sub-cluster comprises at least two cells that transmit to a corresponding single user in the cluster for the resource allocation unit;
    - the controller dynamically divides the cluster into a corresponding set of non-interfering sub-clusters independently for each of multiple, different resource allocation units; and
    - the corresponding sets of non-interfering sub-clusters are different for at least two of the resource allocation units.

24. A cluster-level controller for the network of claim 23.

25. A cellular wireless communications network comprising one or more clusters, each cluster comprising:
- a plurality of cells; and
- a cluster-level controller that dynamically divides the cluster into a set of non-interfering sub-clusters for a resource allocation unit, wherein:
    - each sub-cluster comprises one or more cells that transmit to a single user in the cluster for the resource allocation unit;
    - at least one sub-cluster comprises at least two cells that transmit to a corresponding single user in the cluster for the resource allocation unit;
    - one or more of the cells have a remote radio head (RRH), but no dedicated baseband unit (BBU); and
    - the cluster comprises a shared BBU for all of the cells in the cluster, wherein the shared BBU implements the controller.

26. The invention of claim 25, wherein the plurality of cells further comprises a master cell having the shared BBU.

27. The invention of claim 26, wherein:
- none of the cells in the cluster has a BBU; and
- the shared BBU is cloud-implemented.

* * * * *